R. W. WHITLATCH.
SOLUBLE PERFUME TABLET.
APPLICATION FILED FEB. 28, 1908.

962,872. Patented June 28, 1910.

Russell W. Whitlatch,
Inventor

Attest,
F. R. Wright
E. B. Griffith

UNITED STATES PATENT OFFICE.

RUSSELL W. WHITLATCH, OF BROOKLYN, NEW YORK, ASSIGNOR TO RAIMES & COMPANY, OF NEW YORK, N. Y., A CORPORATION OF NEW YORK.

SOLUBLE PERFUME-TABLET.

962,872.　　　　Specification of Letters Patent.　　Patented June 28, 1910.

Application filed February 28, 1908. Serial No. 418,302.

*To all whom it may concern:*

Be it known that I, RUSSELL W. WHITLATCH, a citizen of the United States, residing at Brooklyn, in the county of Kings and State of New York, have invented certain new and useful Improvements in Soluble Perfume-Tablets, of which the following is a specification.

My invention relates to perfume tablets, and more particularly to perfume tablets designed to be dissolved in water and to give forth a perfume upon dissolution.

The object of my invention is to provide a tablet of this character which shall either be contained within an object floating or resting in water contained in a vessel,—as for instance a finger bowl, or which when dissolved shall release a small object or figure of an attractive nature which shall float about in said water,—the preferable form of my invention contemplating the use of objects which shall expand when placed in water and be released by the dissolving of the tablet.

I have shown my invention in the accompanying drawings, wherein—

Figure 1:
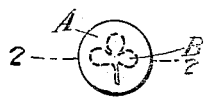
Figure 2:
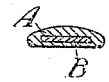
Figure 3:
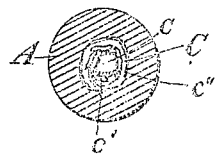
Figure 4:
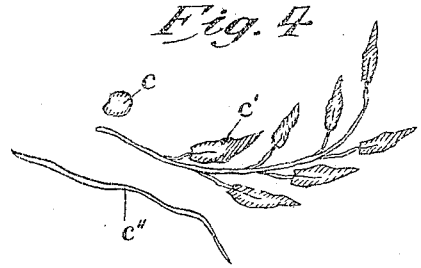
Figure 5:
Figure 6:
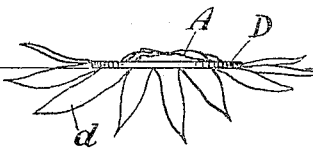
Figure 7:
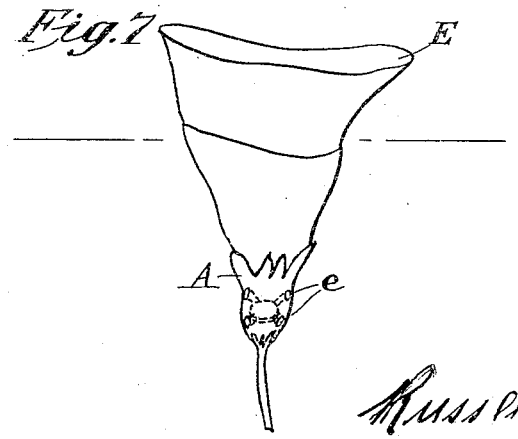

Figure 1 is a top view of a tablet containing a very simple object, the outline of which is shown in dotted lines. Fig. 2 is a section of the tablet on line 2—2, Fig. 1. Fig. 3 is a horizontal section of a tablet containing the objects known as " Japanese buds." Fig. 4 is a view showing the " bud " in Fig. 3 expanded,—the tablet having dissolved. Fig. 5 is a side view of an artificial flower designed to be inserted in a bowl of water, the petals of the flower being closed. Fig. 6 is a side view of the flower opened, as by contact with water, the tablet therein being partly dissolved. Fig. 7 is a view of an artificial flower, the calyx of which contains the tablet.

Like letters in all the figures designate like parts.

Figs. 1 and 2 show the simplest form of my invention. Therein A designates a tablet readily soluble in water. I find that a tablet composed of orris root, tartaric acid and bicarbonate of soda, answers the purpose very well, this combination of chemicals making a tablet which dissolves with great rapidity and the same time effervesces attractively. With these ingredients I include any desired perfume which will act to scent the water in which the tablet is dissolved. The tablet is molded in a suitable machine and incloses within it a small body B of paper, wood-shavings, or the like materials which are buoyant in water when released from the tablet. In Figs. 1 and 2 this object is shown with the outline of a shamrock. When the tablet is dissolved, as by being thrown into a finger bowl, it sinks to the bottom of the bowl, effervesces rapidly and perfume is given off. When the tablet is nearly or quite dissolved, the inclosed object is released from engagement with what remains of the tablet and rises to and floats upon the surface of the water. The figure of the shamrock is, of course, peculiarly appropriate to dinners given on St. Patrick's Day, but I may inclose any other figure deemed appropriate to any occasion.

In Fig. 3 I show a tablet A of the same character as that above described, but containing an object C, which will unfold or expand when brought into contact with water. These objects are known as " Japanese buds". They are made of a shaving of dyed wood. They consist of an inner core or disk $c$ around the outer edge of which is wrapped a thin sliver of dyed wood $c'$ cut to represent flowers or figures. This is held in place by a soluble binder, usually a very small thin band $c''$ of wood shaving whose ends meet and are fastened together by some soluble material. When placed in water the binder dissolves and the object C expands and floats. I inclose these " buds " in the body of the tablet which when dissolved releases the bud which rises to the surface and expands as above described. Fig. 4 shows such a " bud " expanded. The " bud " itself is not my invention, it being well known in commerce.

I have above described tablets inclosing an object, but I also contemplate an object inclosing a tablet, said object being arranged to expand on contact with water, and allow the tablet to dissolve, when the object will rise to the surface.

In Figs. 5 and 6 I have shown an artificial flower D which might be made of wood shavings after the manner of the Japanese bud above referred to, with petals $d$ which fold down over and inclose the tablet A. These petals are held closed by any suitable soluble binding material. When this bud is placed in water the weight of the tablet will cause it to sink, the soluble binder will dissolve and the petals upon the action of the water upon the wood will uncurl or expand. In doing so they will allow the water to come in contact with the tablet which will begin to dissolve. When sufficiently dissolved as to no longer act as a counterweight to the bud, the flower will rise to the surface and be expanded.

In Fig. 7 I have shown an artificial flower E in the calyx of which is placed a tablet. There may be openings e in the base of the flower through which water will reach the tablet, whereupon the flower will rise, or it may be the flower will permanently float upon the surface of the water, the calyx of the flower being submerged.

It will be seen that my invention may be made in many attractive forms and is applicable to a large number of circumstances. It forms an attractive novelty to be placed in the finger bowls at dinners and other entertainments and on these occasions the body inclosed within the tablet or inclosing the same may be formed in such configuration as will be appropriate to the occasion.

I do not wish to be limited, of course, to the forms shown in my drawings above referred to, nor to the specific details,—either as to the composition of the tablet or the construction of the body.

It is to be noted that the combination of chemicals from which the tablet is preferably made by me gives a tablet which is quickly soluble and of a high degree of effervescence when placed in water. I do not wish, however, to be limited to this effervescent quality.

Having described my invention what I claim is:

1. In a tablet the combination of a material quickly soluble and effervescent in water and an object which is changed in form when said material is dissolved.

2. In a tablet the combination of a material soluble in water and heavier than water and an object lighter than water, the tablet sinking in the water when placed therein, and the object rising to the surface when said material is dissolved.

3. In a tablet the combination of a material soluble in water, an object inclosed by said material, a binder soluble in water to maintain said object in a predetermined form, the action of the water dissolving said material and said binder to release the object from said material and change its form.

4. In a tablet the combination of a material comprising orris root, tartaric acid and bicarbonate of soda and an object connected with said material.

In testimony whereof, I have signed my name to this specification in the presence of two subscribing witnesses.

RUSSELL W. WHITLATCH.

Witnesses:
J. W. LYON,
E. B. GRIFFITH.